(12) United States Patent
Furman, Jr. et al.

(10) Patent No.: US 8,747,616 B2
(45) Date of Patent: Jun. 10, 2014

(54) METHOD FOR THE EMULSIFICATION OF ASA WITH POLYAMIDOAMINE EPIHALOHYDRIN (PAE)

(75) Inventors: Gary S. Furman, Jr., St. Charles, IL (US); Robert M. Lowe, Chicago, IL (US); David J. Castro, DeKalb, IL (US)

(73) Assignee: Ecolab USA Inc, Naperville, IL (US)

( * ) Notice: Subject to any disclaimer, the term of this patent is extended or adjusted under 35 U.S.C. 154(b) by 0 days.

(21) Appl. No.: 13/611,450

(22) Filed: Sep. 12, 2012

(65) Prior Publication Data

US 2014/0069600 A1   Mar. 13, 2014

(51) Int. Cl.
| | |
|---|---|
| D21H 17/16 | (2006.01) |
| D21H 17/17 | (2006.01) |
| D21H 17/55 | (2006.01) |
| D21H 17/62 | (2006.01) |
| D21H 21/16 | (2006.01) |
| D21H 21/18 | (2006.01) |
| C07D 307/60 | (2006.01) |

(52) U.S. Cl.
USPC ............ 162/164.6; 162/158; 162/164.1; 162/164.3; 162/185; 162/192; 162/380; 549/233; 516/72

(58) Field of Classification Search
USPC ............ 162/158, 164.1, 164.3, 164.6, 168.1, 162/168, 2, 183, 185, 192, 380; 549/231, 549/233, 327–329; 516/53, 72, 73, 75; 366/108
See application file for complete search history.

(56) References Cited

U.S. PATENT DOCUMENTS

| | | | |
|---|---|---|---|
| 2,726,154 A | 12/1955 | Land | |
| 2,926,116 A | 2/1960 | Keim | |
| 3,058,873 A | 10/1962 | Keim et al. | |
| 3,102,064 A | 8/1963 | Wurzburg et al. | |
| 3,311,594 A | 3/1967 | Earle, Jr. | |
| 3,772,076 A | 11/1973 | Keim | |
| 3,821,069 A | 6/1974 | Wurzburg | |
| 3,968,005 A | 7/1976 | Wurzburg | |
| 4,040,900 A | 8/1977 | Mazzarella et al. | |
| 4,529,447 A | 7/1985 | Okada et al. | |
| 4,657,946 A | 4/1987 | Rende et al. | |
| 5,456,800 A * | 10/1995 | Tansley et al. | 162/158 |
| 5,759,249 A * | 6/1998 | Wasser | 106/209.1 |
| 5,865,951 A | 2/1999 | Kawakami et al. | |
| 6,277,242 B1 | 8/2001 | Archer et al. | |
| 6,808,691 B1 * | 10/2004 | Herve et al. | 422/294 |
| 7,291,695 B2 | 11/2007 | Wei et al. | |
| 7,455,751 B2 | 11/2008 | Ward et al. | |
| 7,550,060 B2 | 6/2009 | Jacobson et al. | |
| 7,683,121 B2 | 3/2010 | Wei et al. | |
| 7,785,442 B2 | 8/2010 | Jacobson et al. | |
| 7,938,934 B2 * | 5/2011 | Todorovic et al. | 162/164.6 |
| 8,066,847 B2 | 11/2011 | Grigoriev et al. | |
| 2006/0183816 A1 * | 8/2006 | Gelman et al. | 523/201 |
| 2012/0103547 A1 | 5/2012 | Grimm et al. | |

FOREIGN PATENT DOCUMENTS

| | | |
|---|---|---|
| EP | 0961856 A1 | 12/1999 |
| JP | H06299494 A | 10/1994 |
| JP | 2955763 B2 * | 10/1999 |

OTHER PUBLICATIONS

Machine translation of JP 2955763, Advanced Industrial Property Network, Japan Patent Office, [online], [retrieved on Oct. 28, 2013]. Retrieved from the Internet: <URL: http://dossier1.ipdl.inpit.go.jp/AIPN/odse_top_dn.ipdl?N0000=7400 >.*

* cited by examiner

*Primary Examiner* — Dennis Cordray
(74) *Attorney, Agent, or Firm* — Benjamin E. Carlsen

(57) ABSTRACT

The invention is directed towards methods and compositions for improving the sizing of paper using PAE. Proper sizing of paper requires that a sizing agent adequately disperse so as to evenly distribute on the paper. Proper sizing also requires that the agent not cause runnability or chemical problems with other materials or equipment used in the papermaking process. PAE displays unexpected attributes that allow it to disperse sizing agents. Best of all it is not subject to the same overdose effect of typical emulsifiers such as cationic starch. As a result PAE is an excellent option for use in sizing paper.

9 Claims, No Drawings

METHOD FOR THE EMULSIFICATION OF ASA WITH POLYAMIDOAMINE EPIHALOHYDRIN (PAE)

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to methods and compositions useful in emulsifying and feeding sizing agents into a process stream of a papermaking process. Compositions such as alkenyl succinic anhydride (ASA) and alkyl ketene dimer (AKD) are papermaking additives, which enhance a number of hydrophobic paper properties in paper products. The application of these compositions in a papermaking process to introduce these hydrophobic paper properties is called sizing.

Sizing is important both in the papermaking process as well as in the final use of the produced paper product. For example, the extent to which a paper is weakened by the rewetting stage at a size press device during papermaking is influenced by its sizing. Also the structural integrity of a paper product that comes into contact with water is affected by its sizing. As a result food and beverage packaging typically undergoes a high degree of sizing because of the regular contact that occurs between the packaging paper and water.

Generally a sizing agent is introduced during the wet end of a papermaking process. Sizing agents such as ASA are insoluble oily compositions. As a result, they must be emulsified prior to introduction to a papermaking process. Currently a number of technologies are used to facilitate the emulsification of sizing agents in papermaking processes.

In order to adequately emulsify a sizing agent for a papermaking process, two requirements must be met. First, the resulting emulsion must impart on the produced paper good sizing properties. Second, the emulsion must also be easily applied to papermaking machines. Prior art methods of forming emulsions include: mechanical processes such as those described in U.S. Pat. No. 7,938,934 and European Patent EP 0961856 and chemical processes such as those described in U.S. Pat. Nos. 4,657,946 and 4,529,447.

One deficiency in some chemical emulsification processes is what can be called the "overdose effect". Prior art in chemical emulsification processes often possess a maximum dosage. When the dosage of the chemicals is increased up to the maximum dosage their effectiveness (as measured for example according to the HST or Hercules Sizing Test) also increases. However once the maximum dosage has been reached the further additions of these chemicals has negligible or no improvement. This overdose effect limits the overall effectiveness of sizing agents in papermaking processes.

Thus it is clear that there is a clear utility in novel methods and compositions for the emulsification of ASA for sizing applications. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment of the invention is directed towards a method of emulsifying a sizing agent, the method comprising the steps of: adding to a sizing agent composition PAE, the PAE being in an amount sufficient to emulsify the sizing agent.

The sizing agent may be selected from ASA, AKD, rosin, and any combination thereof. The PAE may comprise polymers made from polyaminoamide and epihalohydrin. The PAE may also comprise a copolymer in which epihalohydrin and polyaminoamides are monomers from which the polymer chain is built. The epihalohydrin may comprise between 0.05 mol % and 1.8 mol % of the PAE based on secondary amines in the polyaminoamide. The PAE may have a molecular weight range between 10,000 and 5,000,000 Daltons. The ratio of PAE to sizing agent may be at least 0.1:1.

At least one embodiment of the invention is directed towards a composition comprising: water, a sizing agent, and PAE in which the sizing agent is dispersed throughout the water in the form of an emulsion. The sizing agent may be ASA.

At least one embodiment of the invention is directed towards a method of preparing sized paper products, the method comprising the step of adding PAE and a sizing agent to a thin stock paper furnish during the wet-end of a papermaking process prior to the dewatering stage of the papermaking process. The sizing agent may be selected from ASA, rosin, and any combination thereof. The PAE may be fed into the paper furnish by at least two distinct feed streams, one feed stream comprises PAE and excludes a sizing agent, the other comprises PAE combined with a sizing agent. The ratio of PAE to the sizing agent may be more than 2.5:1. The ratio of PAE to the sizing agent may be greater than the overdose effect limit of a traditional emulsifier. The ratio of PAE to the sizing agent may be greater than the overdose effect limit of a starch emulsifier. More than 35% of the sizing agent may be dispersed in particles having a volume greater than 2 μm. The PAE may exclude tertiary amines. The PAE may be a terpolymer of adipic acid, diethylenetriamine and epichlorohydrin.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"ASA" means alkenyl succinic anhydride, where the alkenyl moiety is at least C12 and the succinic anhydride may be positioned in any carbon within the alkenyl moiety.

"Emulsion" means a thermodynamically unstable dispersion which is a mixture of a dispersed phase liquid highly dispersed as small globules throughout a continuous phase liquid that it is otherwise immiscible with, Emulsions can be at least temporarily stabilized by surfactants, emulsifiers, or physical mixing processes.

"HST" means Hercules Sizing Test as described in document T 530 om-02 by TAPPI (2002).

"PAE" means polyaminoamide-epihalohydrin resin and includes polyaminoamide-epichlorohydrin resin, polyaminoamide-epibromohydrin resin, and any combination thereof.

"Papermaking process" means a method of making any kind of paper product (e.g. paper, tissue, board, etc.) from pulp comprising forming an aqueous cellulosic papermaking furnish, draining the furnish to form a sheet and drying the sheet, and may also include a pulping stage.

"Polyalkylene polyamines" means those organic compounds having two primary amine (—NH$_2$) groups and at least one secondary amine group where the amino nitrogen atoms are linked together by alkylene groups, provided no two nitrogen atoms are attached to the same carbon atoms. Representative polyalkylene polyamines include diethylenetriamine (DETA), triethylenetetraamine (TETA), tetraethylenepentaamine (TEPA), dipropylenetriamine, and the like.

"Promoter" means a composition of matter that does not (to a significant degree or at all) on its own effect a particular process (including but not limited to a chemical reaction), but its presence increases the performance of another composition of matter in effecting that particular process (such as the chemical reaction), promoters include but are not limited to catalysts.

"Runnability" means the propensity of an item passing through an industrial process to avoid jamming, clogging, warping, and/or otherwise not smoothly traversing, one or more pieces of equipment in that process.

"Sheet" refers to a relatively thin layer of cellulosic fibers formed as a result of or during a papermaking process.

"Sizing" means an application in a papermaking process which reduces the hydrophilic nature of cellulose in paper and thereby increases its resistance to penetration by hydrophilic liquids.

"Sizing Agents" means compositions of matter added to a papermaking process to facilitate sizing, it includes but is not limited to ASA and/or AKD and/or rosin as well as those sizing compositions and/or methods described in U.S. patent application Ser. No. 12/938,017, Published US Patent Application 2012/0103547 A1, U.S. Pat. Nos. 5,865,951, 7,455,751, 4,657,946, 4,040,900, 3,102,064, 3,968,005, and 3,821,069, Japanese Patent 06299494, and any combination thereof.

"Wet-end" refers to that portion of a papermaking process involving an approach system, a sheet forming section, and/or a pressing section.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

Sizing agents such as ASA, AKD, and any combination thereof are commonly added to papermaking processes in order to improve the sizing properties of the resulting paper. These agents are typically added in the form of an emulsion. Such emulsions may comprise some or all of an emulsifier, water, a surfactant, and/or a stabilizing agent. Examples of commonly used emulsifiers are polymers, liquid starch, and cooked starch. An example of a commonly used stabilizing agent is a surfactant.

In at least one embodiment the sizing agent comprises ASA. Suitable examples of ASA are disclosed in U.S. Pat. No. 3,102,064. ASA typically has the structural formula:

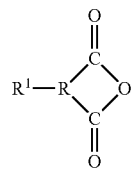

wherein R represents a dimethylene or trimethylene radical, and wherein R$^1$ is a hydrophobic group containing more than 5 carbon atoms which may be selected from the group consisting of alkyl, alkenyl, aralkyl or aralkenyl groups.

In at least one embodiment suitable ASA may be produced by the high temperature reaction of maleic anhydride (MA) and a long chain internal olefin. The olefin to MA mole ratio is usually greater than 1.0. The type of olefin used to produce the ASA can have a significant impact on sizing performance. The olefins employed in commercial ASA sizes typically contain a carbon chain length of 16-18. In at least one embodiment the preparation is performed according to an ene reaction according to the process described in U.S. patent application Ser. No. 12/403,072.

In at least one embodiment, a dosage of sizing agent emulsion is prepared and fed into a papermaking process by the addition of PAE to the sizing agent. In at least one embodiment the PAE is pre-mixed with the agent prior to their addition to the papermaking process. In at least one embodiment the agent and the PAE are fed separately into the papermaking process.

Sizing agents such as ASA are strongly reactive with water and rapidly hydrolyse and form hydrolysates. In addition, because the agents are hydrophobic and do not evenly mix with water they end up being unevenly distributed throughout the paper sheet. This can result in some portions of the paper product not having sufficient water resistance and other portions having other undesired attributes. Many prior art emulsifiers address the emulsification requirements of the agent at the expense of imposing runnability problems on the papermaking equipment, or by causing unwanted reactions with other papermaking additives including but not limited to strength additives, fillers, and whitening agents. Surprisingly PAE creates an effective emulsion with sizing agents without runnability issues and without causing side effects with other additives. As a result, PAE can be used as an emulsifier without runnability issues, in dosages such that if used with other sizing agent emulsifiers would cause runnability issues.

As described for example in U.S. Pat. Nos. 7,683,121, 7,291,695 and 8,066,847, PAE has been used as a wet end strength resin. As such PAE forms a polymer network which holds paper web together preventing it from falling apart due to excessive swelling. The use of PAE as a sizing agent emulsifier is quite surprising and unexpected as they have unrelated properties. ASA is a debonder which prevents the agglomeration of masses (namely water with cellulose). In contrast PAE is a network bonder which holds agglomerations of masses together.

While another wet end strength resin, namely the aldehyde-functionalized resins of U.S. Pat. No. 4,657,946 and U.S. patent application Ser. No. 12/938,017 has been shown to have application as a sizing agent emulsifier, by no means is it obvious that all wet end strength resins will function as sizing agent emulsifiers. Emulsifying sizing agents use utterly dissimilar chemical process from those used to form a wet end web. Moreover the tendency of wet end strength resins to interact with and reinforce fiber webs suggests that they will form agglomerations that could increase runability issues, the exact opposite of the attributes desirable in a sizing agent emulsifier.

In addition the substitution of wet-strength resins as sizing agent emulsifiers is not an inherent combination that occurs in papermaking processes because they have non-compatible entry stages into the papermaking process. Papermaking processes often include a fan pump stage in which the thick stock solution is mixed with dilution water (such as white water). Subsequent to the fan pump stage is the headbox stage where the fiber-water slurry is distributed along a wire. Because ASA hydrolyzes in water it must be introduced only a short time prior to the headbox and therefore subsequent to the fan pump. PAE in contrast is added well before the fan pump (often in the machine chest) because otherwise it does not have enough time to distribute well onto the fibers and impart its wet strength hydrophobic properties. As a result, because the two compositions are added at dissimilar times, the inventive formation of the emulsion is not an inherent characteristic of a papermaking process and does not occur in typical papermaking processes.

In addition as the following examples will show, PAE-sizing agent emulsions operate via chemical mechanisms that are utterly different from those of aldehyde-functionalized resin emulsions. The difference between the two is apparent when one notes that PAE also operates as a sizing agent promoter while the aldehyde-functionalized resins do not. Experimental data shows that increasing the dosage of aldehyde-functionalized resins in the presence of a sizing agent (after a exceeding a certain dosage) reduces the sizing effect. In contrast increasing the dosage of PAE in the presence of a sizing agent increases the sizing effect beyond what the sizing agent achieves by itself. In addition, the particle size and distribution of PAE caused sizing agent emulsions is superior than that caused by aldehyde-functionalized resin sizing emulsions because the particle size distributions of the former show a shift towards smaller median particle size. These smaller particles secure an even more uniform distribution of the sizing agent across the fiber stock, which translates in higher sizing efficiency.

Without being limited by theory, nor design, nor the scope afforded in construing the claims it is believed that PAE also operates according to a cooperative mechanism with the sizing agent while aldehyde-functionalized resins do not and instead seem to use an antagonistic mechanism. Thus PAE both emulsifies and promotes sizing while aldehyde-functionalized resins seem to degrade sizing when dosed independently of the sizing agent, but this degradation is overcome by an increase in sizing caused by effectively emulsifying the sizing agent with the aldehyde-functionalized resin. As a result there is no reason to expect that the effectiveness of one wet end strength resin suggests some overall rule that all wet strength resins will work as well. Moreover PAE's effectiveness as a sizing agent promoter shows an unexpected way of remedying the overdose effect that plagues ASA-based sizing agents.

In at least one embodiment, the PAE and/or the method of its preparation, is according to that described in one or more of U.S. Pat. Nos. 2,926,116, 2,926,154, 3,058,873, 3,311,594, 3,772,076, and 6,277,242. In at least one embodiment, representative PAE compositions useful in this invention are water soluble, cationic thermosetting resins prepared by reacting one or more polyalkylene polyamines containing secondary amine groups and one or more dicarboxylic acid derivatives to form a polyaminoamide and then reacting the polyaminoamide with an epihalohydrin (such as epichlorohydrin) to form the polyaminoamide-epihalohydrin resin.

In at least one embodiment the PAE is formed according to the reaction:

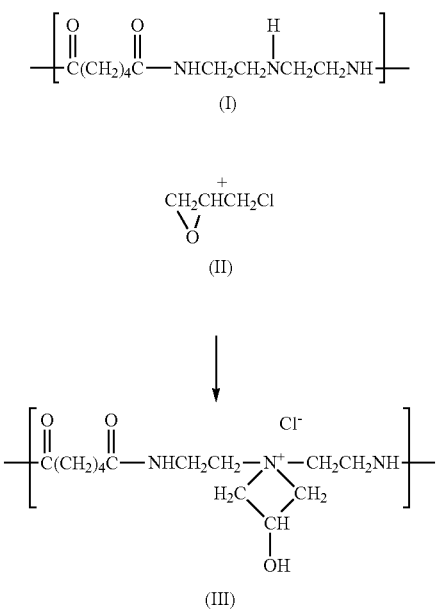

Wherein (I) is a representative example of a polyaminoamide, (II) is a representative example of a epihalohydrin and (III) is a single building block of the resulting polyaminoamide-epihalohydrin resin polymer chain.

Preparation of the polyaminoamide is as described above. In an embodiment, the organic dicarboxylic acid derivative and polyalkylene polyamine are reacted in a molar ratio of about 0.8:1 to about 1.4:1. In another embodiment, the organic dicarboxylic acid derivative and the polyalkylene polyamine are reacted in a molar ratio of about 0.9:1 to about 1.0:0.9.

The polyaminoamide is then reacted with epichlorohydrin under controlled conditions to form the PAE. In at least one embodiment, the polyaminoamide is diluted with water to a concentration of about 10 to about 50 weight percent, and the solution is cooled below about 25° C. An amount of epichlorohydrin sufficient to react with the desired amount of the secondary amino groups in the polyaminoamide is then slowly added in the solution. The mixture is then heated at a temperature of about 40° C. to about 100° C. until desired viscosity is reached, typically about 2 to about 8 hours.

In at least one embodiment, the polyaminoamide is reacted with about 0.01 to about 1.8 molar equivalents of epihalohydrin, based on secondary amino groups of the polyaminoamide. In at least one embodiment, the PAE has a weight-average molecular weight of about 10,000 to about 5,000,000 Daltons and the polyaminoamides have a weight-average molecular weight of about 500 to about 500,000 Daltons. In at least one embodiment, the epihalohydrin is epichlorohydrin.

In at least one embodiment, the PAE has a weight-average molecular weight of about 50,000 to about 2,000,000 Daltons.

In at least one embodiment, the PAE is prepared by reacting the polyaminoamide with about 0.05 to about 0.8 molar equivalents of epichlorohydrin, based on secondary amino groups of the polyaminoamide. In another embodiment, the PAE is prepared by reacting the polyaminoamide with about 0.1 to about 0.3 molar equivalents of epichlorohydrin, based on secondary amino groups of the polyaminoamide.

In an embodiment, the PAE has a weight-average molecular weight of about 100,000 to about 1,000,000 Daltons.

In an embodiment, the PAE is a terpolymer of adipic acid, diethylenetriamine and epichlorohydrin.

The PAE (both as an emulsifier and/or as a sizing agent promoter) may be applied as a dilute aqueous solution. In an embodiment, the aqueous solution comprises about 0.01 to about 50 percent by weight of PAE, about 0.01 to about 50 percent by weight of sizing agent, and about 99.98 to about 50 weight percent water. The pH of the aqueous solution may be adjusted in order to further stabilize the composition. In an embodiment, the pH is adjusted to about 2-7. In another embodiment, the pH is adjusted to about 4-6. The pH adjustment may be accomplished using any organic or inorganic acid. Representative acids include formic, acetic, sulfuric, hydrochloric, phosphoric, and the like. In an embodiment, the pH is adjusted using sulfuric or phosphoric acid or a mixture thereof.

In at least one embodiment the PAE and the sizing agent are pre-mixed before their addition to the paper web. The resulting emulsion may comprise by weight 0.01-60% sizing agent (such as ASA, rosin, and any combination thereof), and 0.001-80% PAE.

In at least one embodiment a pre-mixed PAE-sizing agent emulsion is fed into the papermaking process and a separate stream containing PAE but lacking sizing agent is also fed before, simultaneous to, and or after the feeding of the emulsion. This allows for optimizing the utilization of PAE as a sizing agent promoter.

The sizing agent may be used in combination with one or more materials that are cationic in nature or capable of ionizing or dissociating in such a manner as to produce one or more cations or other positively charged moieties. Such cationic agents have been found useful as a means for aiding in the retention of sizing compositions. Among the materials that may be employed as cationic agents in the sizing process are, for example, alum, aluminum chloride, long chain fatty amines, substituted polyacrylamide, chromic sulfate, animal glue, cationic substituted PAM, cationic thermosetting resins and polyamide polymers. Particularly suitable cationic agents include, for example, cationic starch derivatives, including primary, secondary, tertiary or quaternary amine starch derivatives and other cationic nitrogen substituted starch derivatives, as well as cationic sulfonium and phosphonium starch derivatives. Such derivatives may be prepared from all types of starches including corn, tapioca, potato, waxy maize, wheat and rice. Moreover, they may be in their original granule form or they may be converted to pregelatinized, cold water soluble products and/or employed in liquid form.

To obtain advantageous sizing, it is generally desirable to uniformly disperse the sizing agents throughout the fiber slurry in as small a particle size as possible, preferably smaller than 2 micron. This may be achieved, for example, by emulsifying the sizing compositions prior to addition to the stock utilizing mechanical means such as, for example, high speed agitators and mechanical homogenizers, in addition to PAE.

The sizing compositions of the present invention are useful for the sizing of paper prepared from all types of both cellulosic and combinations of cellulosic with non-cellulosic fibers. The cellulosic fibers that may be used include, for example, sulfate (Kraft), sulfite, soda, neutral sulfite semichemical (NSSC), thermomechanical (TMP), chemi-thermomechanical (CTMP), groundwood (GWD), recycled fibers (RF) and any combination of these fibers. Any of the foregoing cellulosic fibers may be bleached or unbleached. These designations refer to wood pulp fibers that have been prepared by any of a variety of processes that are typically used in the pulp and paper industry. In addition, synthetic fibers of the viscose rayon or regenerated cellulose type may also be used. The paper may also contain mineral fillers such as ground calcium carbonate, precipitated calcium carbonate, clay, titanium dioxide, other mineral fillers commonly used in papermaking. These can be part of the paper as individual components or as a mixture of various mineral fillers.

The amount of sizing composition that may be employed to size paper may vary depending, for example, on the particular sizing composition employed, the particular pulp involved, the specific operating conditions, the contemplated end-use of the paper, and the like. Typical concentrations of the sizing composition, based on the dry weight of the pulp in the finished sheet or web, may range from about 0.25 to about 20 pounds per ton (lb/ton). In an embodiment, the sizing composition may be employed at a concentration of from about 0.5 to about 10 lb/ton, with a concentration of from about 1 to about 5 lb/ton being more preferred and a concentration of from about 1 to about 2 lb/ton being still more preferred.

Because sizing agents rapidly hydrolyze, in at least one embodiment the PAE sizing agent emulsion is added to the papermaking process almost simultaneous to the formation of the emulsion. In at least one embodiment the emulsion is created at least in part utilizing at least one of the devices listed in U.S. Pat. No. 7,938,934. In at least one embodiment the introduction is accomplished at least in part utilizing at least one of the devices listed in U.S. Pat. Nos. 7,785,442 and 7,550,060.

In at least one embodiment prior to adding the sizing agent emulsions to a paper machine, the ingredients of the emulsions are exposed to a mixing pump which accomplishes a mixing of the pertinent ingredients of these emulsions. The mixing can be accomplished in several ways, the method of mixing being immaterial to the application as long as the results of the mixing are common to the materials. By results of mixing we mean that the mixing agitation devices that are used to admix the ingredients of the sizing agent emulsion must accomplish the formation of stable emulsions having an sizing agent particle size ranging between about 0.01 to about 5 microns in size. It is preferable that the admixing equipment be capable of forming emulsion sizes having a particle size ranging between about 0.5-3 microns, and it is most preferable that this equipment be able to form the sizing agent emulsion having a particle size below 2 microns and having a relatively narrow particle size distribution ranging between about 1.5+1 microns in size.

In at least one embodiment the ingredients of the sizing agent are added into the feed side of a pump capable of emulsion formations, the discharge of this pump being split so that a portion of the discharge goes to the paper machine while another portion of the discharge is fed back to the feed point of the pump. By controlling the percentage of output of this type of pump which is recirculated back to the feedpoint of the pump, one may control the amount of energy that the components of the emulsion are exposed to and thereby control the quality of the emulsion formed by the sizing agent emulsion ingredients. The use of sufficient energy, as controlled by output recycle ratios, can control sizing agent emulsion particle size within the ranges taught above. By controlling the ratio of output to feedback from the emulsifying pump one can control the particle size of the emulsion to achieve the desired physical characteristics of these sizing agent emulsion sizes.

EXAMPLES

The foregoing may be better understood by reference to the following examples, which are presented for purposes of illustration and are not intended to limit the scope of the invention.

Table 1 provides a brief description of the PAE resins referenced in both examples. The variations among these PAE resins is mainly in average molecular weight and azetidinium ion content.

TABLE 1

| Emulsifier code | Emulsifier | Description |
|---|---|---|
| Control | Nalco 7548 | Commercial ASA emulsifier |
| PAE-A | Nalco 64800 | Yankee coating PAE |
| PAE-B | Nalco 64894 | Yankee coating PAE |
| PAE-C | Nalco 03PV034 | Nalco wet strength aid PAE |
| PAE-D | GP 25HP | GP wet strength aid PAE |

Example 1

ASA emulsions were prepared in a laboratory miniblender. Deionized water, emulsifier, and ASA were added in that order and were mixed for 90 seconds. Particle size distributions were obtained using light scattering techniques immediately after the emulsions were further diluted and used for the handsheets. The control emulsifier used was an acrylamide/dimethylaminoethyl methacrylate methyl chloride quat copolymer (DMAEM.MCQ).

Four handsheets with an approximate weight of 80 g/m$^2$ were prepared. A 1% thin stock for each handsheet was mixed in a Dynamic Drainage Jar at 800 rpm. The various PAE amounts were fed as well as the ASA emulsion, polyaluminum chloride additive, and a cationic flocculant in 15-second intervals. After mixing the sheets were formed by adding the thin stock into a handsheet mold having an 80-mesh screen, pressed into a static press at 0.5 MPa for 5 minutes, and dried by passing the sheets through a drum-dryer for 1-minute at about 210° F. The resistance to liquid penetration was determined using the Hercules Sizing Test (HST) (Tappi method T 530) with a 20% formic acid, napththol green dye solution at 80% reflectance. The conditions and results are as follows:

TABLE 2

| Sample | Co-fed PAE lb/t | Emulsifier | Ratio Emulsifier: ASA | Median Particle Size μm | Volume above 2 μm % | ASA lb/t | HST, s |
|---|---|---|---|---|---|---|---|
| 1 | 0 | Control | 0.1:1 | 1.20 | 29 | 0 | 0.2 |
| 2 | 0 | Control | 0.1:1 | 1.20 | 29 | 3.0 | 20.1 |
| 3 | 0 | Control | 0.1:1 | 1.20 | 29 | 3.5 | 25.0 |
| 4 | 0 | Control | 0.1:1 | 1.20 | 29 | 4.0 | 51.5 |
| 5 | 7.5 | Control | 0.1:1 | 1.20 | 29 | 0 | 0.1 |
| 6 | 7.5 | Control | 0.1:1 | 1.20 | 29 | 3.0 | 277.0 |
| 7 | 7.5 | Control | 0.1:1 | 1.20 | 29 | 3.5 | 256.5 |
| 8 | 7.5 | Control | 0.1:1 | 1.20 | 29 | 4.0 | 243.8 |
| 9 | 10 | Control | 0.1:1 | 1.20 | 29 | 0 | 0.0 |
| 10 | 10 | Control | 0.1:1 | 1.20 | 29 | 3.0 | 422.2 |
| 11 | 10 | Control | 0.1:1 | 1.20 | 29 | 3.5 | 455.2 |
| 12 | 10 | Control | 0.1:1 | 1.20 | 29 | 4.0 | 413.8 |
| 13 | 0 | PAE-D | 0.1:1 | 1.29 | 31 | 3.0 | 10.9 |
| 14 | 0 | PAE-D | 0.1:1 | 1.29 | 31 | 3.5 | 38.7 |
| 15 | 0 | PAE-D | 0.1:1 | 1.29 | 31 | 4.0 | 25.4 |
| 16 | 0 | PAE-D | 0.3:1 | 1.21 | 27 | 3.0 | 22.2 |
| 17 | 0 | PAE-D | 0.3:1 | 1.21 | 27 | 3.5 | 21.4 |
| 18 | 0 | PAE-D | 0.3:1 | 1.21 | 27 | 4.0 | 29.2 |
| 19 | 0 | PAE-D | 2.5:1 | 1.98 | 49 | 3.0 | 203.3 |
| 20 | 0 | PAE-D | 2.5:1 | 1.98 | 49 | 3.5 | 248.0 |
| 21 | 0 | PAE-D | 2.5:1 | 1.98 | 49 | 4.0 | 343.7 |

The results of the data demonstrate the following:
1) The co-addition of PAE into a furnish containing ASA increases the sizing response.
2) The ASA sizing effect increases when PAE is used as the emulsifier in a ratio of PAE:ASA of 2.5:1.
3) No significant differences in sizing effect occurred when either the control emulsifier or PAE ratio to ASA is 0.1:1 or 0.3:1.
4) No significant differences in particle size distributions occur when PAE or the control is the emulsifier in a ratio of emulsifier to ASA of 0.1:1 or 0.3:1. However the median particle size and volume above 2 μm increases when the PAE:ASA ratio is increased to 2.5.

Of particular note is the fact that under some circumstances PAE emulsifiers operate up to 10 times as well as the control emulsifier. This may be due to its ability to operate as a promoter in addition to its ability to emulsify the sizing agent. In addition because it is not subject to the overdose effect, much larger dosages of PAE (such as 7.5 times as much) can be used without losing effectiveness due to the overdose effect.

Example 2

A second study was performed showing the ability of different PAE chemistries to emulsify ASA. ASA emulsions were prepared in a laboratory miniblender. Deionized water, emulsifier, and ASA were added—in that order—and mixed for 90 seconds. Particle size distributions were obtained using light scattering techniques immediately after the emulsions were prepared. The emulsions containing either the commercially available emulsifier or the PAE were further diluted and used for the handsheets. The typical ASA emulsifier is an acrylamide/dimethylaminoethyl methacrylate methyl chloride quat copolymer (DMAEM.MCQ). The following table summarizes the main particle size properties from the particle size distributions.

TABLE 3

| Emulsifier code | Emulsifier: ASA | Median particle size, μm | Above 2 μm, % |
|---|---|---|---|
| Control | 0.1 | 0.94 | 14.7 |
| PAE-A | 0.1 | 1.34 | 31.8 |
|  | 2.5 | 0.67 | 3.5 |
| PAE-B | 0.1 | 1.35 | 34.7 |
|  | 2.5 | 0.64 | 12.8 |
| PAE-C | 2.5 | 0.94 | 7.9 |
| PAE-D | 2.5 | 0.82 | 10.4 |

Three replicate sheets were prepared for each experimental condition with a target basis weight of 80 g/m$^2$. The 0.5% old corrugated cardboard (OCC) thin stock was mixed in a Dynamic Drainage Jar at 1000 rpm for each handsheet. The ASA emulsion, a polyaluminum chloride additive, and a cationic flocculant were added in 15-second intervals. After mixing, the basesheet was formed in a handsheet mold using an 80-mesh screen, pressed in a roll press at 0.35 MPa, and dried by passing the sheets through a drum-dryer for 1 minute at about 210° F. The resistance to liquid penetration was determined using the Hercules Sizing Test (HST) with formic acid, napththol green dye solution at 80% reflectance. HST measurements were conducted at two formic acid concentrations, 10% and 25%, in order to cover the large range of sizing response and increase the resolution for a limited number of conditions. The conditions and main results for the study are summarized in the table below.

TABLE 4

| Condition | Emulsifier code | Emulsifier: ASA | ASA, $lb_{actives}$/t | $PAE_{net}$, $lb_{actives}$/t | Tensile strength index Nm/g | HST (25% formic acid), s | HST (10% formic acid), s |
|---|---|---|---|---|---|---|---|
| 1 | Control | 0.1 | 3.0 | 0.0 | 53.6 | 39 | 646 |
| 2 | PAE-A | 0.1 | 3.0 | 0.3 | 52.8 | 54 | 1449 |
| 3 | PAE-A | 2.5 | 3.0 | 7.5 | 60.4 | 31 | 475 |
| 4 | PAE-B | 0.1 | 3.0 | 0.3 | 54.4 | 59 | 1413 |
| 5 | PAE-B | 2.5 | 3.0 | 7.5 | 58.7 | 25 | 339 |
| 6 | PAE-C | 2.5 | 3.0 | 7.5 | 63.4 | 345 | — |
| 7 | PAE-D | 2.5 | 3.0 | 7.5 | 61.0 | 287 | — |
| 8 | Control | 0.1 | 3.5 | 0.0 | 54.3 | 43 | 1023 |
| 9 | PAE-A | 0.1 | 3.5 | 0.4 | 53.8 | 53 | 1297 |
| 10 | PAE-A | 2.5 | 3.5 | 8.8 | 62.5 | 30 | 445 |
| 11 | PAE-B | 0.1 | 3.5 | 0.4 | 55.7 | 59 | 1462 |
| 12 | PAE-B | 2.5 | 3.5 | 8.8 | 59.0 | 27 | 344 |
| 13 | PAE-C | 2.5 | 3.5 | 8.8 | 59.2 | 387 | — |
| 14 | PAE-D | 2.5 | 3.5 | 8.8 | 63.2 | 391 | — |
| 15 | Control | 0.1 | 4.0 | 0.0 | 52.6 | 44 | 926 |
| 16 | PAE-A | 0.1 | 4.0 | 0.4 | 53.5 | 49 | 1253 |
| 17 | PAE-A | 2.5 | 4.0 | 10.0 | 61.7 | 29 | 326 |
| 18 | PAE-13 | 0.1 | 4.0 | 0.4 | 52.3 | 54 | 1187 |
| 19 | PAE-B | 2.5 | 4.0 | 10.0 | 59.2 | 26 | 320 |
| 20 | PAE-C | 2.5 | 4.0 | 10.0 | 62.4 | 470 | — |
| 21 | PAE-D | 2.5 | 4.0 | 10.0 | 61.6 | 381 | — |

The results demonstrate that:
For the low and high azetidinium ion content, high MW PAE resins, increasing the emulsifier:ASA ratio from 0.1 to 2.5 results in smaller median particle size.
Both wet strength resins provide significantly greater sizing performance at the 2.5 emulsifier:ASA ratio.
Both low and high azetidinium ion content, high MW PAE resins provide greater sizing performance than the typical emulsifier (DMAEM.MCQ) at the 0.1 emulsifier:ASA ratio. Increasing the emulsifier:ASA ratio from 0.1 to 2.5 significantly decreases the sizing response when the ASA is emulsified with either the low or high azetidinium content, high MW PAE resin.

While this invention may be embodied in many different forms, there is described in detail herein specific preferred embodiments of the invention. The present disclosure is an exemplification of the principles of the invention and is not intended to limit the invention to the particular embodiments illustrated. All patents, patent applications, scientific papers, dictionaries, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of preparing sized paper products, the method comprising the step: of adding PAE and a sizing agent to a thin stock paper sheet furnish during the wet-end of a papermaking process prior to the dewatering stage of the papermaking process, wherein the PAP is in an amount sufficient to emulsify the sizing agent and the ratio of PAE to the sizing agent is more than 2.5:1, and wherein the PAE is fed into the paper sheet furnish by at least two distinct feed streams, one feed stream comprises PAE and excludes a sizing agent, the other comprises PAE combined with a sizing agent.

2. The method of claim 1 in which the sizing agent is selected from ASA, rosin, and any combination thereof.

3. The method of claim 1 in which the ratio of PAE to the sizing agent is greater than the overdose effect limit of a starch emulsifier.

4. The method of claim 1 in which no more than 35% of the sizing agent is dispersed in particles having a particle size greater than 2 micron.

5. The method of claim 1 in which the PAP excludes tertiary amines.

6. The method of claim 1 in which the PAP is a terpolymer of a carboxylic acid (including but not limited to adipic acid), diethylenetriamine and epichlorohydrin.

7. The method of claim 1 further comprising the steps of essentially simultaneously manufacturing the emulsion and feeding the emulsion into a process pipe in the wet-end of a papermaking process with papermaking furnish having an intrinsic mass consistency of between 0.1%-5% wherein the step of manufacturing the ASA is by transmitting ultrasonic waves into a lumen containing ASA, PAE, and at least one liquid which becomes the continuous phase liquid of the emulsion.

8. The method of claim 7 further comprising the steps of: a) providing one or more feeding apparatuses, each feeding apparatus comprising: a first conduit having one or more inlets and outlets; a second conduit having one or more inlets and outlets, wherein the first conduit secures to the second conduit and traverses the second conduit; a mixing chamber that has one or more inlets and outlets, wherein the second conduit secures to the mixing chamber and wherein the outlets of the first conduit and the outlets of the second conduit are in fluid communication with the mixing chamber; and an adaptor that is in fluid communication with the outlet of the mixing chamber and is secured to the mixing chamber; b) mounting at least one feeding apparatus containing an adaptor over an opening in the process pipe, c) introducing the alkenyl succinic anhydride emulsion and one or more chemicals into the mixing chamber of the feeding apparatus by introducing the alkenyl succinic anhydride emulsion or one or more chemicals into the inlets of the first conduit and the second conduit, the alkenyl succinic anhydride emulsion being introduced nearly simultaneous to its ultrasonic manufacture; d) mixing the alkenyl succinic anhydride emulsion and one or more chemicals in the mixing chamber of the feeding apparatus to form a mixture; and e) dispensing the mixture into the process stream through the adaptor of the feeding apparatus that is in communication with the process stream.

9. A method of preparing sized paper products, the method comprising the step of: adding PAE and a sizing agent to a thin stock paper sheet furnish during the wet-end of a papermaking process prior to the dewatering stage of the papermaking process, wherein the PAE is in an amount sufficient to emulsify the sizing agent and the ratio of PAE to the sizing agent is greater than the overdose effect limit of a starch emulsifier, and wherein the PAE is fed into the paper sheet furnish by at least two distinct feed streams, one feed stream comprises PAE and excludes a sizing agent, the other comprises PAE combined with a sizing agent.

* * * * *